(12) United States Patent
Talreja et al.

(10) Patent No.: US 6,618,790 B1
(45) Date of Patent: Sep. 9, 2003

(54) BURST SUSPEND AND RESUME WITH COMPUTER MEMORY

(75) Inventors: Sanjay S. Talreja, Folsom, CA (US); Lance W. Dover, Fair Oaks, CA (US); Ramkarthik Ganesan, Fair Oaks, CA (US); Ramadurai Rajagopal, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/675,288

(22) Filed: Sep. 29, 2000

(51) Int. Cl.[7] ................................................. G06F 12/00
(52) U.S. Cl. ...................................................... 711/105
(58) Field of Search ................................... 711/105, 169

(56) References Cited

U.S. PATENT DOCUMENTS 5,280,594 A * 1/1994 Young et al. .......... 365/230.04
5,559,990 A * 9/1996 Cheng et al. .......... 365/230.04
6,021,478 A * 2/2000 Kerstein et al. ............ 365/236

* cited by examiner

Primary Examiner—Kevin Verbrugge
(74) Attorney, Agent, or Firm—Blakely, Sokoloff, Taylor & Zafman LLP

(57) ABSTRACT

A burst transfer operation with a memory device can be suspended and resumed without having to provide the current memory address when it is resumed. A chip enable signal to the memory device can be deasserted to initiate the suspend operation and place the memory device in a low power standby mode. When the chip enable signal is reasserted, the memory device can be reactivated and the burst transfer can continue where it stopped, without any setup commands. The current address counter and other bus transfer parameters can be saved within the memory device during the suspend operation. When the suspend operation is terminated by reasserting the chip enable signal, the memory device can resume the transfer using the saved parameters.

14 Claims, 9 Drawing Sheets

BURST SUSPEND AND RESUME WITH COMPUTER MEMORY

BACKGROUND OF THE INVENTION

1. Field of the Invention

The invention pertains generally to computers. In particular, it pertains to computer memory bus operations.

2. Description of the Related Art

Many conventional computer systems support various types of transfers over a bus, including a burst read mode. In the burst read mode, which is typically a synchronous clocked operation, a multi-transaction transfer is set up by specifying the starting memory address to begin the transfer from, and the amount of data to be transferred. After the transfer is initiated, it runs to completion, using as many bus transactions as necessary to transfer the specified amount of data. Since the parameters of a burst transfer must be set up, it creates an initial overhead penalty in the form of extra instructions that must be executed by the processor before the transfer can begin. However, once the transfer has begun, it can continue without any involvement by the processor, thus freeing up the processor to perform other tasks while the transfer is taking place. A burst transfer therefore incurs a greater overhead load at the beginning, but is much more efficient once the actual data transactions have begun.

A disadvantage of the burst transfer is that, if it involves transferring a large amount of data, the transfer will occupy the bus for a long time period, and may make the bus unavailable for other higher-priority transfers that request the bus during the burst transfer. Some time-critical transfers may not be able to wait, and must be able to interrupt the burst transfer to take control of the bus. This is accomplished by stopping the burst transfer that is in progress, turning over the bus to the requesting device, and resuming the interrupted transfer when the bus becomes available again. Unfortunately, some of the initial overhead functions must again be incurred to resume the transfer, causing this interruption to be inefficient.

In addition to this overhead burden, a memory latency period is also incurred at the beginning of a transfer, but not in subsequent transactions within that transfer. Typically, multiple words are sensed in parallel from the memory's storage circuits and placed in an output buffer. These words are then output to the bus one at a time. The first read transaction will take longer than one clock cycle, since the address lines must be read first to determine what address to read the initial data from. After applying the address to the memory's selection circuits, a further delay is encountered while waiting for the sense operation to complete. But after the first sense operation, delays are negligible. A current address can be maintained with an incrementing address counter in the memory interface and the address does not have to be placed on the bus again. Also, a background read can sense the next set of data while the previous set is being output onto the bus. By the time the words have been output from the output buffer to the bus, the sense operation has completed and the next set of words is placed in the output buffer. Thus, after the first sense operation, any subsequent sense delays generally do not cause additional delays for the bus because they each take place during the transfer of the previous set of words.

However, if the burst transfer is interrupted and later resumed, the address in a conventional address counter is lost and must be placed on the bus again when the transfer resumes. The memory device must then access the selected address, so all of the initial bus latencies are experienced again. These latency delays are repeated as many times as the burst transfer is interrupted.

FIG. 1 shows a timing diagram of the bus signals for a conventional system. A "#" symbol at the end of a signal name indicates the signal is asserted when it is low, and deasserted when it is high. To begin a burst read operation, a particular memory device is selected by asserting Chip Enable (CE#) to that device. This activates the selected memory device, bringing it out of low-power standby mode. In bus clock (BUS CLK) cycle 2, the initial address is placed on the address lines ADDR, and the Address Valid signal ADV# is asserted to cause the selected memory device to place the address in its address counter. Write Enable (WE#) remains deasserted to indicate this is a read operation. On a subsequent cycle, Output Enable (OE#) is asserted to enable the data line drivers of the memory device, which then places data on data lines DQ(15:0) at cycle 6. MEM CLK is the memory device's internal clock, and CDMSEL is a multiplexer output that selects which of the words in the output buffer is to be placed on the bus next. WAIT is asserted by the memory device whenever it needs to indicate it cannot respond in the current bus clock cycle.

To interrupt the burst, CE# is deasserted as shown at clock cycle 7. When the burst is resumed by reasserting CE# (shown at clock cycle 8, although multiple cycles will typically occur between deasserting and reasserting CE#), ADV# must be asserted again to load the current address from address lines ADDR before data can again be transferred. Additional latency is incurred waiting for the sense operation to complete before that data will be available for placing on the bus. Thus each interruption in a burst transfer results in latencies due to both specifying the address on the bus and performing the initial sense operation within the memory circuits.

DETAILED DESCRIPTION OF THE INVENTION

The invention provides a way to suspend a burst transfer and subsequently resume the transfer at the point at which it was suspended, without having to incur all the initial latency burdens upon resumption. The invention can be applied to a read burst transfer and/or a write burst transfer. The description herein is applied to a read burst transfer, as it is the more complicated of the two. The write burst can operate in essentially the same manner, but with the data lines being driven by the initiating device rather than the target device, with OE# deasserted and WE# asserted.

Figure 1:
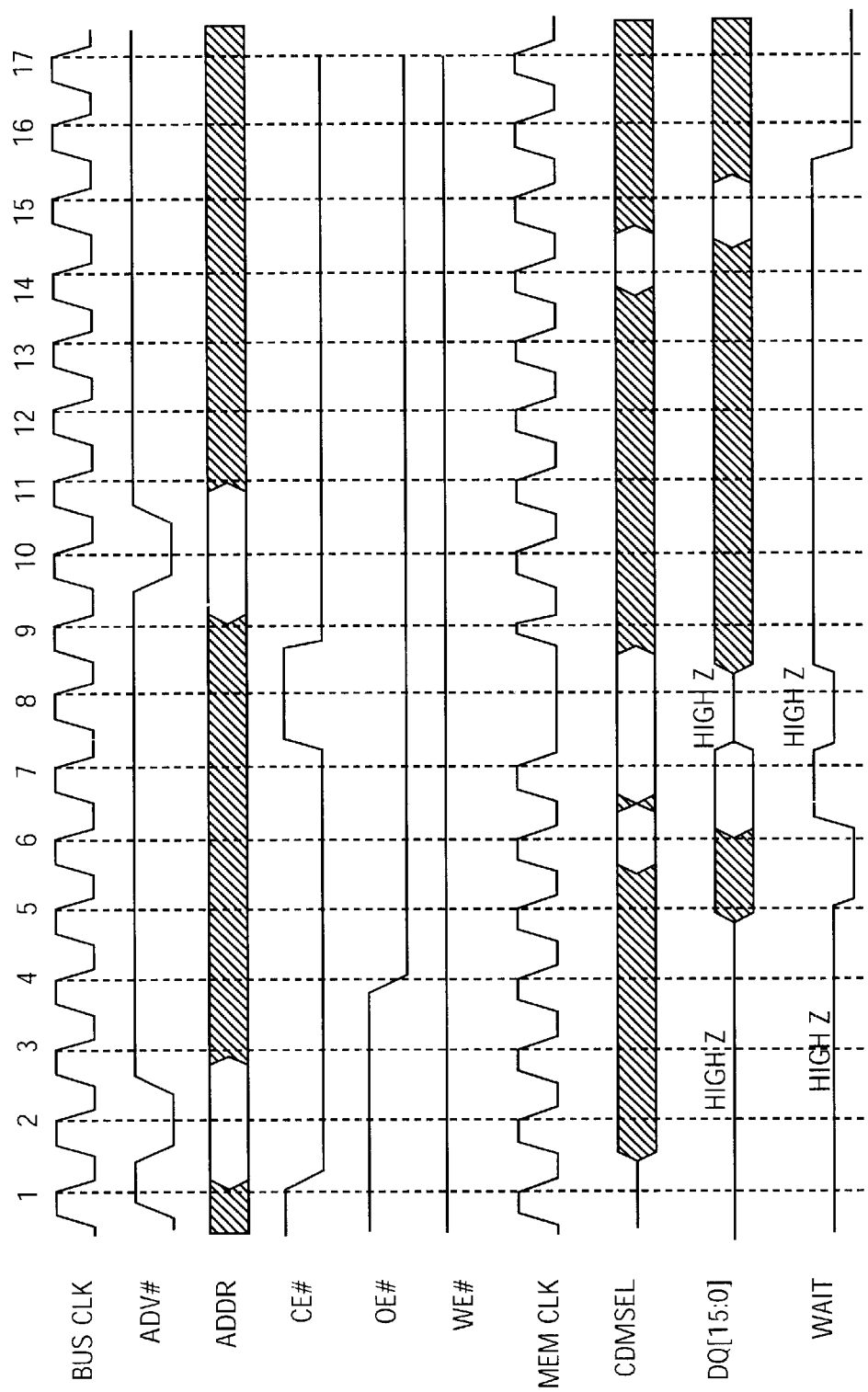
FIG. 1 shows a timing diagram of a system of the prior art.
Figure 2:
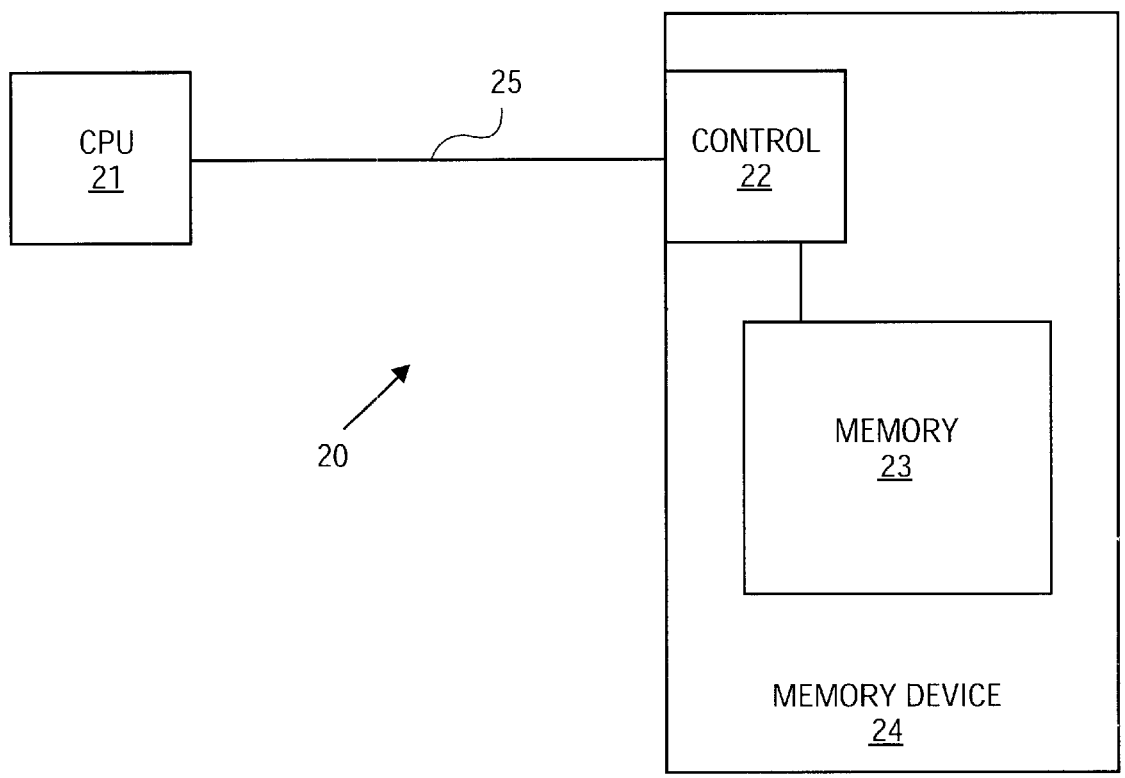
FIG. 2 shows a system of the invention.

FIG. 2 shows a system 20 of the invention. Processor (CPU) 21 communicates with a memory device 24 over bus 25, which can be a synchronous bus. Control circuit 22 interfaces with bus 25, and provides the circuitry to write data into memory 23, read data from memory 23, and provide overall control of memory operations within memory device 24.

Figure 3:
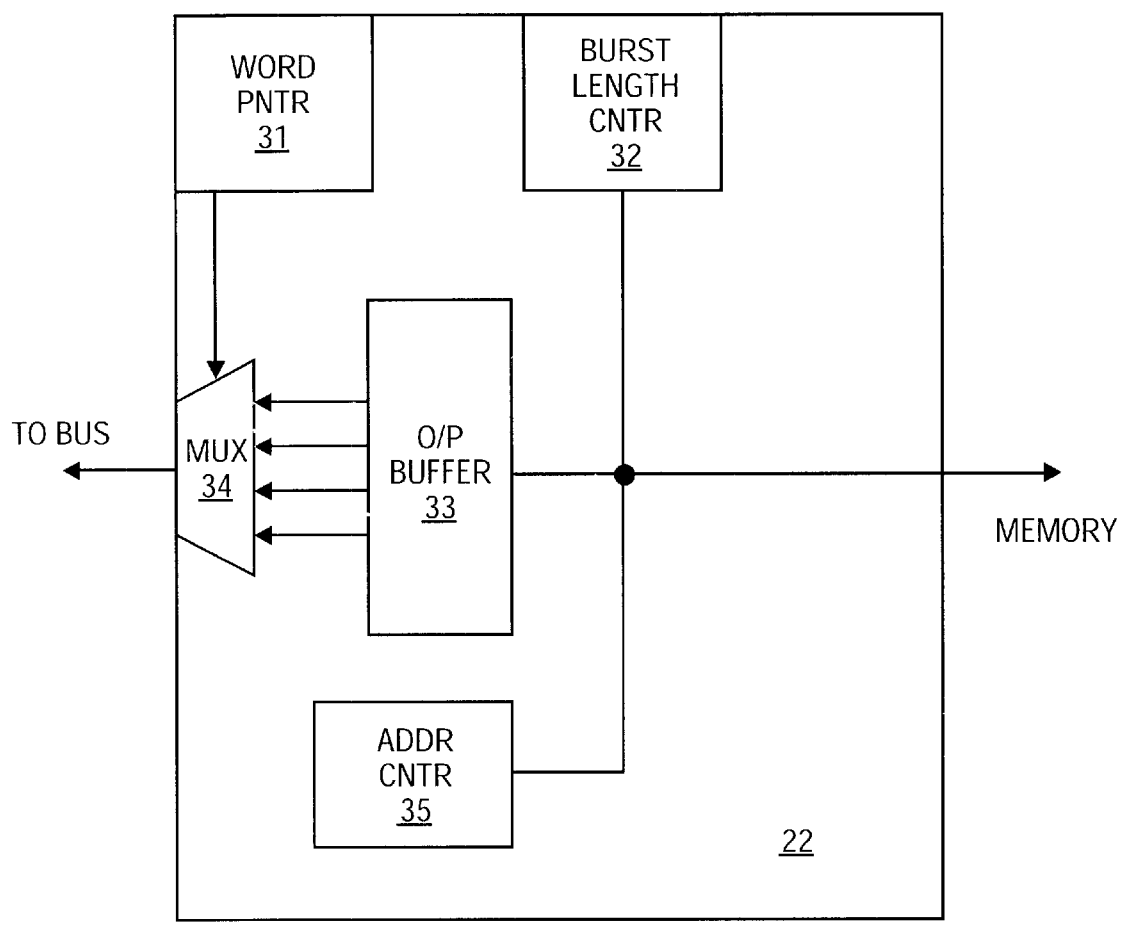
FIG. 3 shows the memory control circuit.

FIG. 3 shows a more detailed schematic of the relevant aspects of control circuit 22. For read operations, control circuit 22 has an output buffer 33 that can latch the data that has been sensed (read out) from memory 23 and is to be transferred onto bus 25. As in the prior art, multiple words (in this example four words) can be sensed in parallel and placed into output buffer 33. Since bus 25 can only accommodate one word at a time, multiplexer 34 selects each of the words from output buffer 33 in turn, placing it on the bus for transfer to the requesting device. Word pointer 31 can select which input of multiplexer 34 is selected. Word pointer 31 can be a two-bit counter that increments after each word is placed on the bus, selecting each of the four multiplexer inputs sequentially.

Since only the initial memory address is given to control circuit 22 for a burst transfer, that address can be loaded into address counter 35, which can be incremented after each sense operation to provide memory 23 with the address of the next location to be read. Burst length counter 32 can keep track of how much data remains to be read before the burst transfer is complete. Address counter 35 and burst length counter 32 can be loaded with the appropriate bus transfer parameters by CPU 21 when the burst transfer is being set up. This can be done by activating the memory device by asserting its CE# line, and sending the appropriate commands to control circuit 22 over bus 25. Word pointer 31 can be reset to zero at the beginning of a burst transfer.

Once a burst transfer has been set up and started, the burst transfer can be suspended by deasserting a chip enable (CE#) signal to the memory device during the transfer, and reasserting that signal when the burst is to be resumed, without having to re-establish the address. Chip enable, sometimes also referred to as component enable, is a common signal function in bus technology. In a conventional system, deasserting CE# resets the Read State Machine (RSM) in the memory device, which resets the address counter and causes the current address to be lost. In the invention, the contents of address counter 35 can remain intact when CE# is deasserted, and therefore the address can be available when CE# is reasserted.

Figure 4:
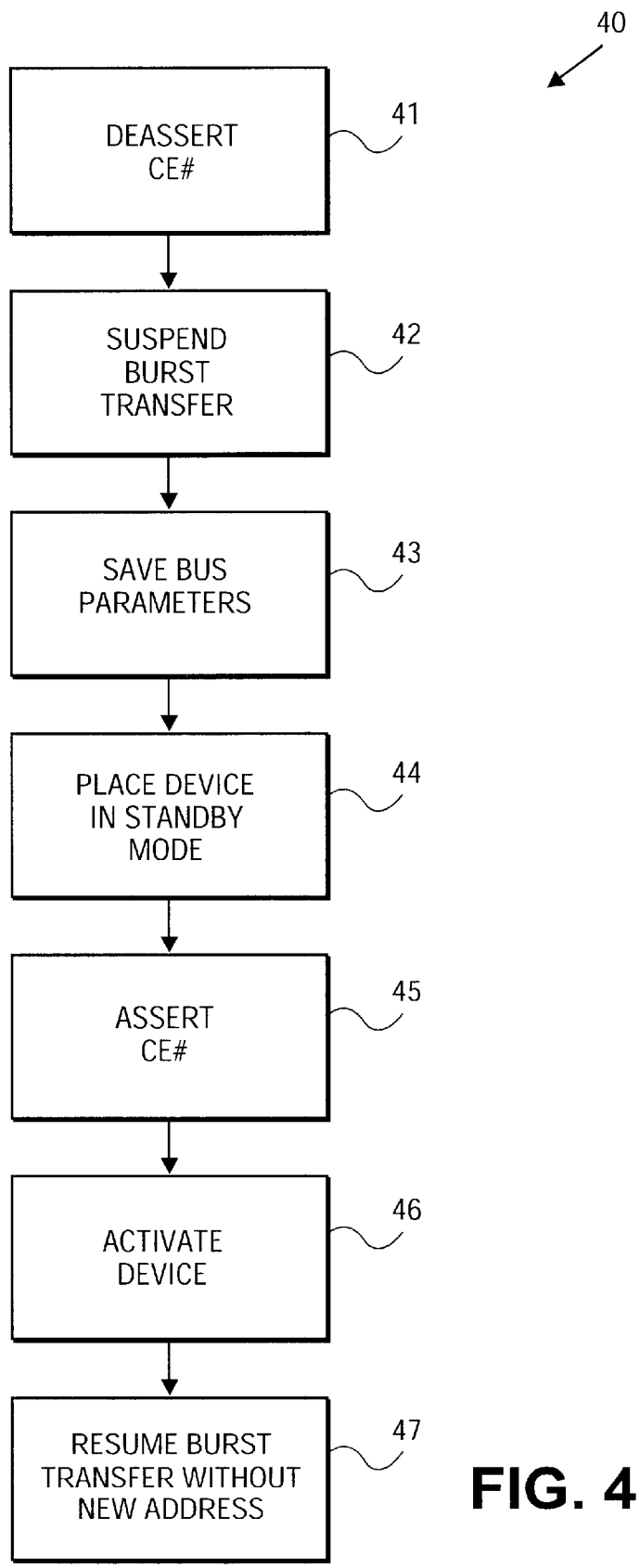
FIG. 4 shows a flow chart of a method of the invention.

FIG. 4 shows a flow chart 40 of a method of one embodiment of the invention. Assuming a burst transfer is already underway, the chip enable signal to the memory device is deasserted at step 41. This suspends the burst transfer at step 42. The relevant bus parameters are saved at step 43. In one embodiment, saving these parameters is accomplished by leaving them intact in their respective counters. At step 44, the memory device is placed in a low-power standby mode, and the suspend operation is underway. Subsequently, when it is time to end the suspend state and resume the burst transfer, the chip enable signal is reasserted at step 45, which activates the memory device at step 46. At step 47, the burst transfer is resumed. Significantly, this resumption is accomplished without having to transfer the next memory address to the memory device over the bus.

In one embodiment, the burst may be suspended at any time while in burst mode. This includes during the initial latency before the first unit of data is placed on the bus, or after any word has been driven onto the bus by the memory device. When a burst transfer is suspended, all internal sense activity can be terminated. Previously latched sensed data in output buffer 33 does not need to be flushed as a result of the suspend, but can be held there until the resume begins, and then output from the output buffer. Partial senses, or senses that did not result in latching of all the data, can be disregarded.

To remember its current state during a suspend, the memory device can retain various bus transfer parameters. Bus transfer parameters are parameters that are used in regulating the bus transfer operation. These can include:

1) the resume address—the address at which the transfer will start when it resumes. Since address counter 35 already has this information, the contents of counter 35 can be left intact during the suspend. When the transfer is resumed, counter 35 can continue its normal operation. This contrasts with a conventional system, in which the address counter is reset by a suspend operation.

2) the remaining burst length—the number of sense operations that remain before the burst transfer completes. Since burst length counter 32 already has this information, the contents of counter 32 can be left intact during the suspend. When the transfer is resumed, counter 32 can continue its normal operation.

3) the word pointer—this indicates which of the multiple words that were sensed in the last sense operation is to be transferred over the bus next. The contents of word pointer 31 can be left intact during the suspend operation.

During the initial latency period at the beginning of a transfer, the memory device can drive the bus with Wait states while waiting for the requested data to appear. Depending on where the burst was suspended, a variable number of Wait states may be driven onto the bus when the transfer is resumed. If, for example, the burst was suspended just before an internal sense completed, the data from that incomplete sense will be lost, but there will likely be one or two words left in the output buffer from the previous sense. When the burst is resumed, these one or two words can be driven onto the bus without any Wait states, but there may be Wait states driven on the bus before the following data is available because a new sense operation must be completed.

On the other hand, if a burst is suspended immediately after completion of a sense operation, the data from that sense operation can be placed in the output buffer and all of it preserved during the suspend. When the burst resumes, that data is available in the output buffer and can be placed on the bus without any Wait states. Since the full output buffer is being transferred, there will be enough time to complete the next sense operation before the output buffer is emptied, and the following data can then be loaded into the output buffer and transferred with no Wait states.

Thus, the amount of latency that is avoided by the invention can be variable, depending on the state of the sense operation when the suspend operation is initiated.

One embodiment of the invention can use a wait-with-data policy. In this embodiment, WAIT# is deasserted concurrently with the data, which signifies that data can be valid any time WAIT# is deasserted.

Another embodiment of the invention can use a wait-before-data policy. In this embodiment, WAIT# is deasserted one clock cycle before valid data is driven by the memory device. This signifies that data can be valid on the next cycle after WAIT# is deasserted. In both embodiments, WAIT# can be tristated one clock cycle after a deasserted CE# has been clocked into the memory device, and can remain that way until a reasserted CE# has been clocked into the memory device. Operating in the wait-with-data mode can ensure the lowest latency after a suspended burst is resumed.

During the time CE# is deasserted, the memory device will be in an inactive low power standby mode, so memory clock MEM CLK can be stopped during that time. Once CE# is reasserted, MEM CLK will start and provide the internal clock needed for various internal operations. However, if MEM CLK is driven from a clock source that is asynchronous to CE#, a spurious clock edge may be created when CE# is asserted, leading to unknown results and possible error conditions. FIG. 5–9 show various timing constraints that will prevent this. For clarity in these examples, MEM CLK is shown being driven by BUS CLK, but the analysis is the same for any other clock source.

Figure 5:
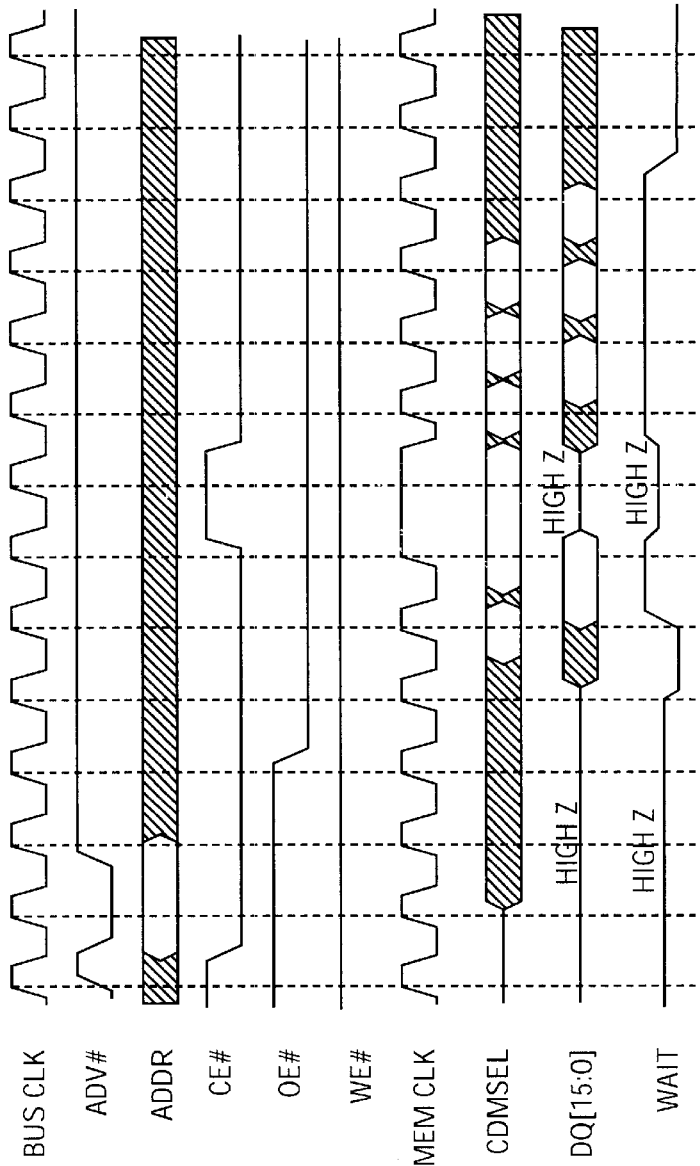
FIGS. 5–9 show timing diagrams of various embodiments of the invention.
Figure 6:
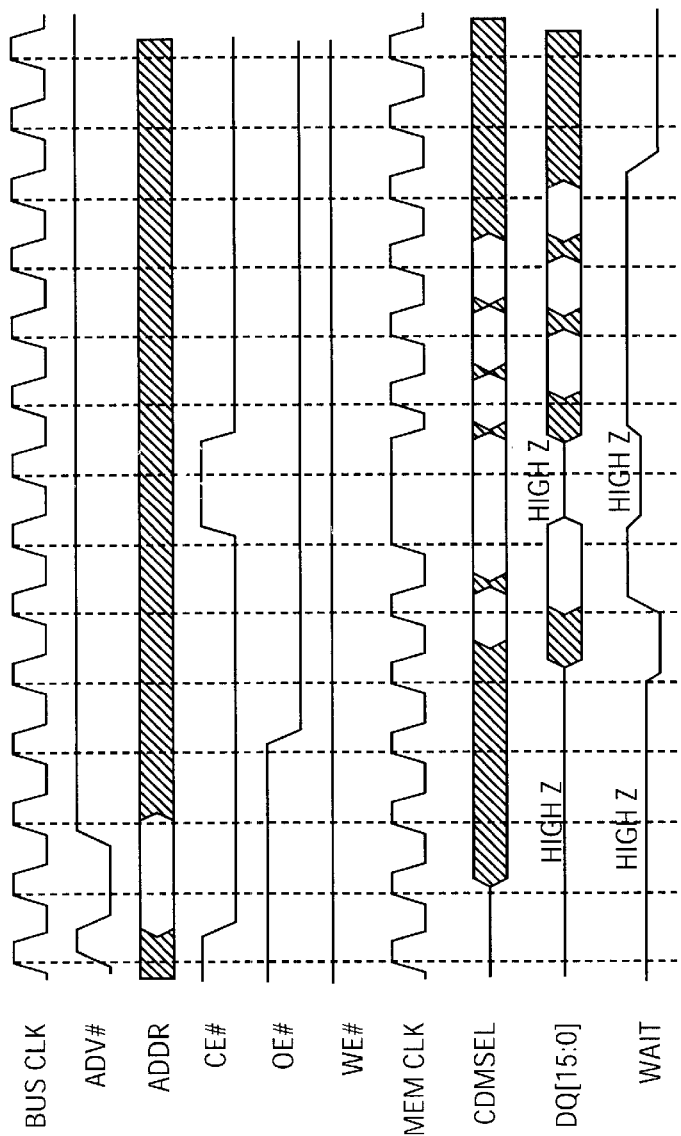

FIGS. 5–8 show timing signals for various embodiments requiring that CE# be asserted only when MEM CLK is high or low, but not during a transition of MEM CLK. FIGS. 5 and 6 depict rising edge systems, i.e., the various internal functions in the memory device are clocked on the rising edge of MEM CLK. In FIG. 5, MEM CLK is high during the suspend, and CE# is reasserted when BUS CLK is low. MEM CLK immediately goes low, and on the next rising edge of BUS CLK, MEM CLK will also produce a rising edge and trigger the initial internal functions in the memory device. FIG. 6 shows the same situation, but CE# is reasserted when BUS CLK is high. MEM CLK initially remains high, but goes low when BUS CLK goes low. When BUS CLK goes high again, MEM CLK also goes high, producing the rising edge required to clock the initial internal functions in the memory device.

Figure 7:
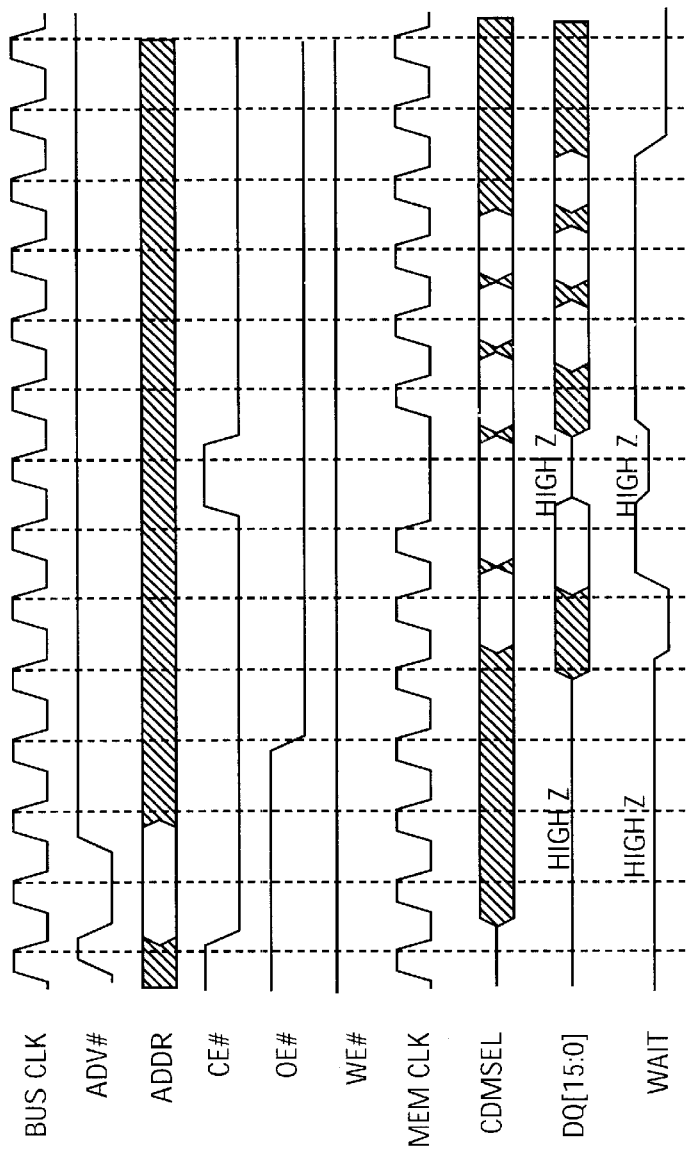
Figure 8:
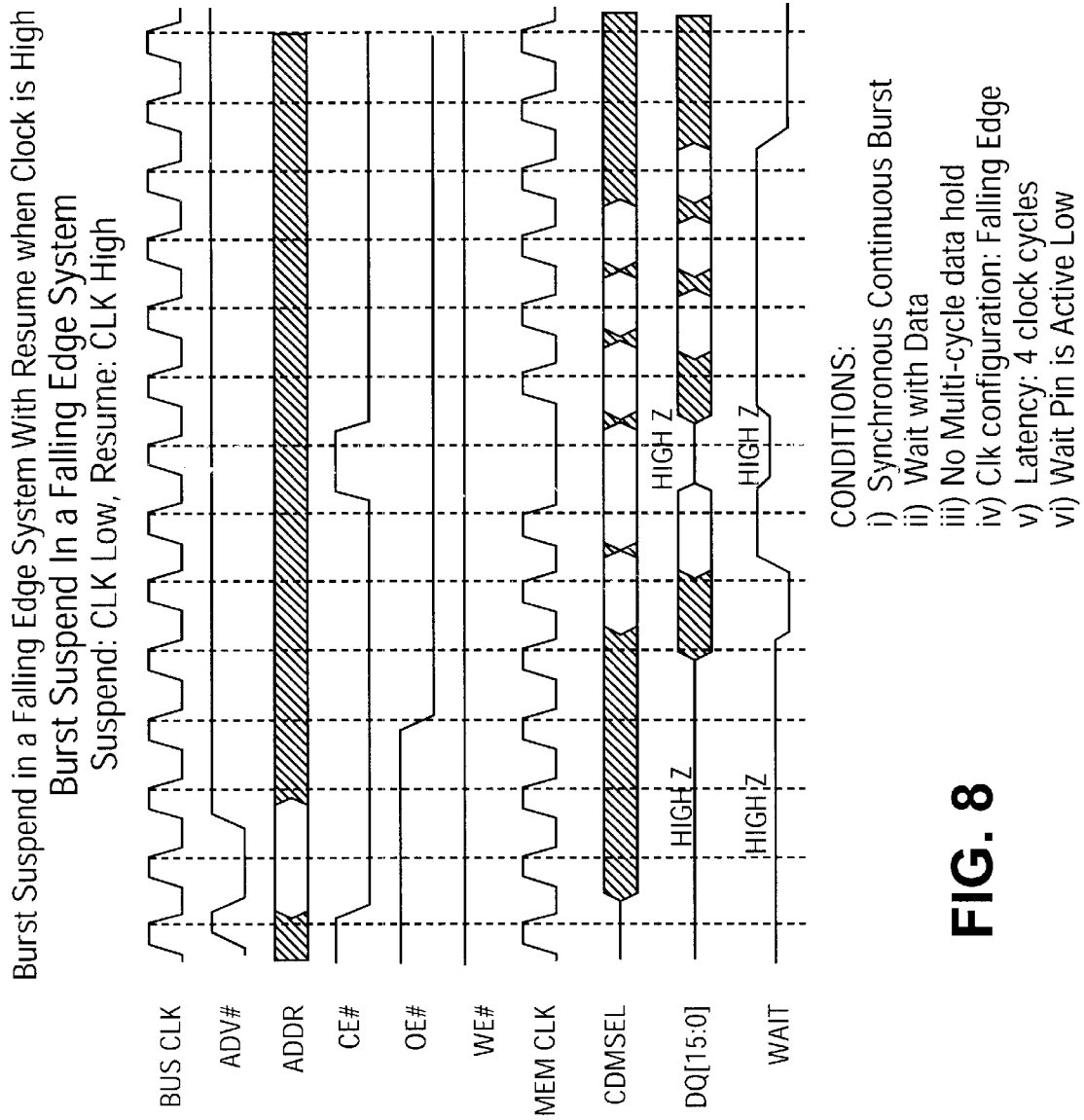

FIGS. 7 and 8 show a falling edge system, in which the various internal functions in the memory device are clocked on the falling edge of MEM CLK. In FIG. 7, MEM CLK is low during the suspend, and CE# is reasserted when BUS CLK is low. MEM CLK initially remains low, and then goes high when BUS CLK goes high. On the next falling edge of BUS CLK, MEM CLK also produces a falling edge to trigger the initial internal functions in the memory device. FIG. 8 shows the same situation, but CE# is reasserted when BUS CLK is high. MEM CLK immediately goes high, and on the next falling edge of BUS CLK, MEM CLK also produces a falling edge to clock the initial internal functions in the memory device.

From FIGS. 5–8 it can be seen that spurious clock edges can be avoided when CE# is asserted if CE# is constrained to being asserted only when the clock source driving MEM CLK is not transitioning.

Figure 9:
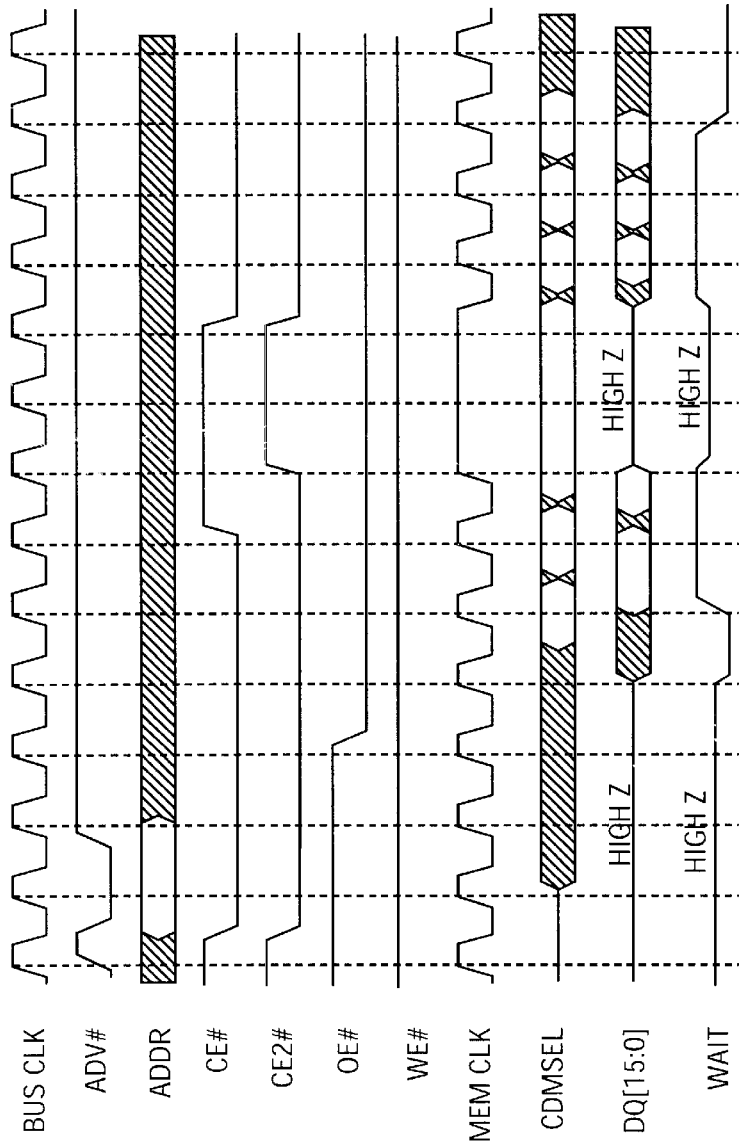

FIG. 9 depicts another embodiment, in which CE# is synchronized with BUS CLK before being used. The synchronized CE# produces CE2#, which has a falling edge that coincides with the falling edge of BUS CLK. CE2# can be produced by a flip-flop clocked with BUS CLK, or by various other well-known synchronizing circuits. CE2# is used to activate the memory device. When CE2# is asserted, MEM CLK goes low. On its next rising edge, it clocks the initial internal functions in the memory device.

The foregoing description is intended to be illustrative and not limiting. Variations will occur to those of skill in the art. Those variations are intended to be included in the invention, which is limited only by the spirit and scope of the appended claims.

We claim:

1. A method, comprising:
    deasserting a chip enable signal to a memory device on a bus during a burst transfer operation;
    suspending the burst transfer operation in response to deasserting the chip enable signal;
    retaining a resume address and a remaining burst length parameter in the memory device while the burst transfer operation is suspended;
    reasserting the chip enable signal to the memory device; and
    resuming the burst transfer operation in response to reasserting the chip enable signal without transferring any portion of a resume address over the bus.

2. The method of claim 1, wherein the burst transfer operation is a read operation.

3. The method of claim 1, wherein the burst transfer operation is a synchronous transfer operation.

4. The method of claim 1, wherein said suspending includes placing the memory device in a low power mode.

5. An apparatus, comprising:
    a memory device to couple to a bus and comprising a control circuit to save a resume address and a remaining burst length parameter and to place the memory device into a standby mode and suspend a burst transfer operation when a chip enable signal on the bus is deasserted, and to activate the memory device and resume the burst transfer operation without receiving any portion of a resume address over the bus when the chip enable signal is reasserted.

6. The apparatus of claim 5, wherein the burst transfer operation is a read operation.

7. The apparatus of claim 5, wherein said control circuit includes a circuit to retain the resume address and the remaining burst length parameter while the burst transfer is suspended.

8. The apparatus of claim 5, wherein the burst transfer operation is a synchronous transfer operation.

9. The apparatus of claim 5, wherein the standby mode is a low power mode.

10. A system, comprising:
    a processor;
    a bus coupled to the processor and comprising an enable line to carry a chip enable signal; and
    a memory device coupled to the bus and having a control circuit to save a resume address and a remaining burst length parameter and to place the memory device into a standby mode and suspend a burst transfer operation when the chip enable signal is deasserted, and to activate the memory device and resume the burst transfer operation without receiving any portion of a resume address over the bus when the chip enable signal is reasserted.

11. The system of claim 10, wherein the burst transfer operation is a read operation.

12. The system of claim 10, wherein said control circuit includes a circuit to retain the resume address and the remaining burst length parameter while the burst transfer is suspended.

13. The system of claim 10, wherein the burst transfer operation is a synchronous transfer operation.

14. The system of claim 10, wherein the standby mode is a low power mode.

* * * * *